July 7, 1953            G. H. POTTER            2,644,514

AUXILIARY FUEL SUPPLY TANK

Filed May 5, 1950

George H. Potter
INVENTOR.

Patented July 7, 1953

2,644,514

UNITED STATES PATENT OFFICE 2,644,514

AUXILIARY FUEL SUPPLY TANK

George H. Potter, Pontiac, Ill., assignor of forty-nine per cent to Roy D. Wrightam, Pontiac, Ill.

Application May 5, 1950, Serial No. 160,171

1 Claim. (Cl. 158—46.5)

This invention relates to fuel tanks, and more particularly to an inner auxiliary fuel tank incorporated with a main fuel tank and with novel valve, screen and anti-theft means.

A primary object of this invention is to provide an auxiliary fuel tank which may comprise a portion of the main fuel tank, the filling of the inner tank being accomplished at the time that the main tank is filled, although the fuel in the inner tank will remain separated from the main tank until such time as an emergency requires its use.

Another object of this invention is to incorporate with the inner and main tanks an anti-theft guard covering the inlet into the main tank and preventing withdrawal of fuel from either tank, except possibly when the main tank is almost completely full.

Yet another object of this invention is to incorporate a screen with the tank mentioned above, in such manner that the fuel entering the auxiliary tank or inner tank will be strained, thus decreasing the likelihood of a valve at the bottom of the inner tank becoming clogged, this precaution being important inasmuch as access to this valve is difficult.

And a last object to be mentioned specifically is to provide means of the character mentioned above which will be inexpensive and practicable to manufacture, simple, safe and convenient to use, both in tanks used with automobile vehicles as well as stationary tanks, and which will give generally efficient and durable service.

Figure 1:
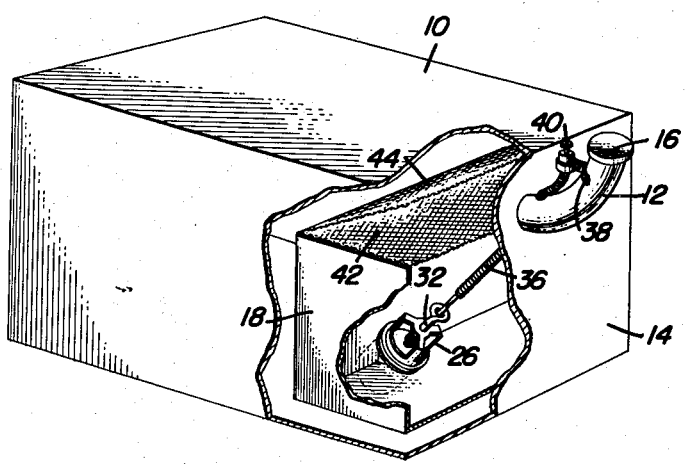
Figure 2:
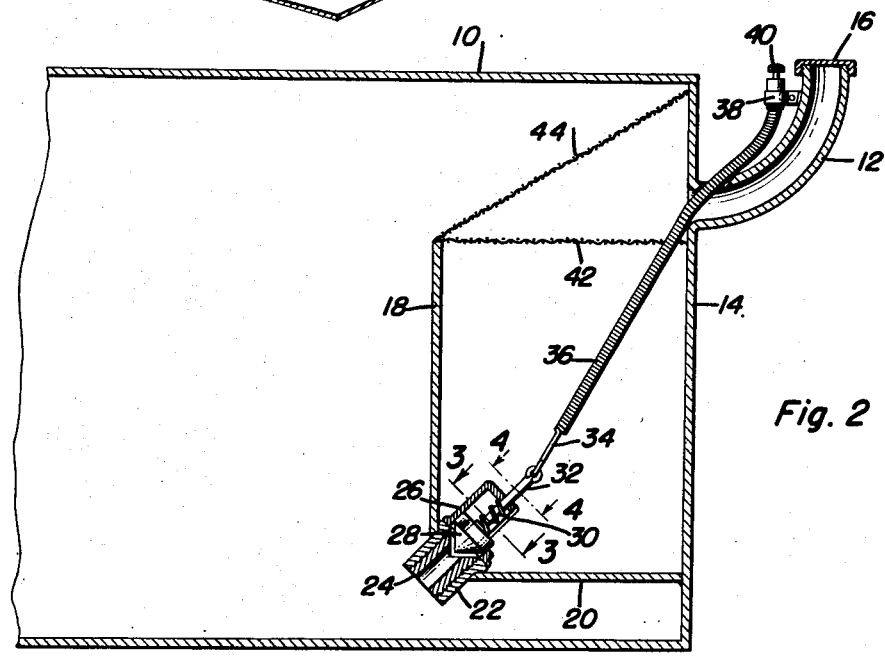
Figure 3:
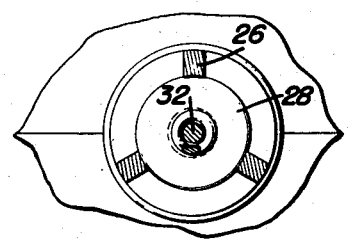
Figure 4:
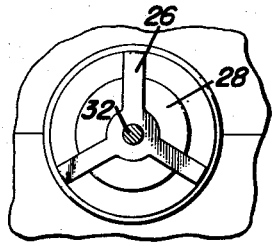

With these objects definitely in view, this invention resides in certain novel features of construction, combination and arrangements of elements and portions as will be hereinafter described in detail in the specification, particularly pointed out in the accompanying claim, and illustrated in the accompanying drawing which forms a material part of this application, and in which:

Figure 1 is a view, in perspective, of a fuel tank with this invention incorporated therein, portions of the main tank being broken away to show underlying portions;

Figure 2 is a fragmentary longitudinal sectional view of the structure shown in Figure 1; and Figures 3 and 4 are transverse sectional views taken on the line 3—3 and 4—4 in Figure 2.

Similar characters of reference designate similar or identical elements and portions throughout the specification and throughout the different views of the drawing.

Referring now to the drawing in detail, this invention includes an outer or main tank 10 having a filler neck or tube 12, which is represented as being laterally and upwardly curved and secured to an end wall or panel 14 of the tank 10. However, the essential element here is that the tank 10 shall have an inlet of some character. In the embodiment illustrated, the tube 12 has a screw cap 16.

An inner tank 18, having a bottom floor panel 20, is incorporated with the end panel 14 of the main tank. A valve casing 22 extends through the bottom of the inner tank and is internally threaded to receive a valve seat member 24. A spider 26 is rigidly secured to the inner end of the valve casing 22, and a valve 28 is guided by the spider 26 and spring pressed into engagement with the valve seat member 24 by a coiled spring 30. The valve stem 32 is also guided by the spider 26 and a flexible wire 34, armored as at 36, is connected to the valve stem 32 and extends upwardly to the exterior of the tank 10. In the embodiment illustrated, the armored wire is supported at its upper end by a bracket 38 which is welded or otherwise secured to the filler tube 12, on the inner longitudinal curve thereof adjacent the tank 10. The upper end of the wire 34 is provided with a knob 40 adjacent the cap 16 for manual control of the wire and the valve 28.

The horizontal screen 42 covers the top of the inner tank, and another screen 44 is secured to the upper edge of the inner tank and extends at an angle above the screen 42 to the panel 14, the screens 42 and 44, together, enclosing the inlet opening of the filler tube 12. In the embodiment illustrated, the screens 42 and 44 are welded or otherwise rigidly secured marginally to the panel 14 and to the tank 10, and it is proposed that the panel 14, inner tank 18, screens 42 and 44, as well as the filler tube, will be fabricated as a unit for securement to a conventional tank in place of the regular end panel thereof, thus facilitating manufacture. The screens 42 and 44 comprise an anti-theft guard, making it difficult for an unauthorized person to syphon fuel from the inner tank or from the greater portion of the main tank. The screens also function in their usual capacity to prevent foreign material entering the tank 18 and fouling the valve.

The operation of this invention will be clearly understood from a consideration of the foregoing description of the mechanical details thereof, taken in connection with the above recited objects and the drawings. Obviously, the relative proportion and configuration of the inner and main tanks may be varied without departure from the spirit of this invention. For example, the particular illustrated shaping of the combination fuel screen and anti-theft guard may be changed considerably to suit the different types of tanks encountered in implementing this invention, the essential feature being that the combination screen and guard shall cover the inlet. In all cases, it is believed preferable that the inlet shall lead directly into the inner tank 18 so that this inner tank will always be filled when fuel is added to the main tank. Furthermore, an important feature of this invention is related to the placement of the armored wire and control knob 40 so that the operator of the machine concerned will have his attention forcibly called to the fact that the fuel supply is depleted. In other words, it is preferred that the control knob 40 sall be located at the tank rather than on the instrument board of the vehicle concerned, when this invention is used with an automotive vehicle, in order that the operator of the vehicle will be compelled to go to some little trouble before the fuel in the auxiliary or inner tank can be made available, thus decreasing the likelihood that the operator will forget that the fuel is nearly exhausted.

Having described the invention, what is claimed as new is:

In a fuel tank of the type including a vertical wall, a laterally and upwardly curved filler neck projecting from said wall and a reserve tank comprising a discharge valve in said fuel tank, a flexible tubular housing having one end portion secured exteriorly on the inner longitudinal curve of the filler neck adjacent the intake end thereof, said housing entering the filler neck through the uppermost portion of the circumferential periphery thereof closely adjacent the fuel tank and traversing same substantially diametrically, said housing being of such diameter relative to that of the filler neck as to obstruct said filler neck against the passage of siphoning tubes of substantial size into the fuel tank, said housing emerging from the discharge end of the filler neck and extending into the reserve tank, and a flexible cable operable in the housing and connected to the valve for actuating same.

GEORGE H. POTTER.

References Cited in the file of this patent

UNITED STATES PATENTS

| Number | Name | Date |
|---|---|---|
| 1,400,727 | Codd | Dec. 20, 1921 |
| 1,410,104 | Lindsey | Mar. 21, 1922 |
| 1,435,001 | Gilmore | Nov. 7, 1922 |
| 1,976,975 | Williams | Oct. 16, 1934 |
| 2,104,132 | McGillicuddy et al. | Jan. 4, 1938 |